United States Patent
Liao et al.

(10) Patent No.: US 8,458,165 B2
(45) Date of Patent: Jun. 4, 2013

(54) SYSTEM AND METHOD FOR APPLYING RANKING SVM IN QUERY RELAXATION

(75) Inventors: Ciya Liao, Fremont, CA (US); Thomas Chang, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 606 days.

(21) Appl. No.: 11/770,027

(22) Filed: Jun. 28, 2007

(65) Prior Publication Data

US 2009/0006360 A1 Jan. 1, 2009

(51) Int. Cl.
*G06F 17/00* (2006.01)

(52) U.S. Cl.
USPC .................... 707/713; 707/728; 707/737

(58) Field of Classification Search
USPC .................... 707/5, 713, 728, 737
See application file for complete search history.

(56) References Cited

U.S. PATENT DOCUMENTS

| | | | |
|---|---|---|---|
| 5,600,829 A | 2/1997 | Tsatalos et al. | |
| 5,873,080 A | 2/1999 | Coden et al. | |
| 6,032,145 A | 2/2000 | Beall et al. | |
| 6,263,328 B1 | 7/2001 | Coden et al. | |
| 6,324,534 B1 | 11/2001 | Neal et al. | |
| 6,345,271 B1 | 2/2002 | Dempsey et al. | |
| 6,691,109 B2 | 2/2004 | Bjornson et al. | |
| 6,871,204 B2 | 3/2005 | Krishnaprasad et al. | |
| 7,299,221 B2 | 11/2007 | Alpha et al. | |
| 2002/0099687 A1 | 7/2002 | Krishnaprasad et al. | |
| 2004/0111453 A1* | 6/2004 | Harris et al. | 708/200 |
| 2004/0225643 A1* | 11/2004 | Alpha et al. | 707/3 |
| 2005/0055336 A1 | 3/2005 | Hui et al. | |
| 2005/0160107 A1* | 7/2005 | Liang | 707/100 |
| 2007/0208730 A1* | 9/2007 | Agichtein et al. | 707/5 |
| 2008/0027925 A1* | 1/2008 | Li et al. | 707/5 |
| 2008/0059508 A1* | 3/2008 | Lu et al. | 707/102 |
| 2008/0215513 A1* | 9/2008 | Weston et al. | 706/13 |
| 2008/0243777 A1* | 10/2008 | Stewart et al. | 707/3 |
| 2008/0270376 A1* | 10/2008 | Svore et al. | 707/5 |
| 2009/0006356 A1* | 1/2009 | Liao et al. | 707/5 |

OTHER PUBLICATIONS

Article entitled "Applying Ranking SVM in Query Relaxation" by Liao et al. dated Jul. 2007.*
Article entitled "Large Margin Rank Boundaries for Ordinal Regression" by Herbrich et al. dated 2000.*
Article entitled "Optimizing Search Engines Using Clickthough Data" by Joachims dated 2002.*
Article entitled "Adapting Ranking SVM to Document Retrieval" by Cao et al. dated 2006.*
Gaasterland, T., "Cooperative Answering through Controlled Query Relaxation," IEEE Expert, IEEE Inc., New York, US, vol. 12, No. 5, Sep. 1, 1997, pp. 48-59.

(Continued)

*Primary Examiner* — Mahesh Dwivedi
(74) *Attorney, Agent, or Firm* — Kilpatrick Townsend & Stockton LLP

(57) ABSTRACT

An enterprise-wide query relaxative support vector machine ranking algorithm approach provides enhanced functionality for query execution in a heterogeneous enterprise environment. Improved query results are obtained by adjusting ranking functions using machine learning methods to automatically train ranking functions. The improved query results are obtained using a list of document-query pairs that are modeled as a binary classification training problem, combination function which requires ranking and learning functions to be implemented representing document attributes and metadata utilizing query relaxation techniques and adjusted ranking functions. Machine learning methods implement user feedback to automatically train ranking functions.

20 Claims, 10 Drawing Sheets

OTHER PUBLICATIONS

Gaasterland, T., "Restricting Query Relaxation Through User Constraints," Intelligent and Cooperative Information Systems, Proceedings of International Conference, May 12, 1993, pp. 359-366.

Kaminaga, Garrett, Oracle Corporation, "Oracle Text 9.0.1 Technical Overview," Oct. 7, 2001, http://oracle.com/products/text/x/Tech-Overviews/text_901.html, printed Sep. 12, 2003, pp. 1-55.

Kaminaga, Garrett, Oracle Corporation, "Oracle8i interMedia Text 8.1.5—Technical Overview," Oct. 7, 2001, http://oracle.com/products/text/x/Tech-Overviews/imt_815.html, printed Sep. 12, 2003, pp. 1-59.

Li et al., "Facilitation Complex Web Queries through Visual User Interfaces and Query Relaxation," Computer Networks and ISDN Systems, North Holland Publishing, Amsterdam, NL, vol. 30, No. 1-7, Apr. 1998, pp. 149-159.

Notification of Transmittal of the International Preliminary Report on Patentability for International Application No. PCT/US2004/010020, Oct. 13, 2005, 9 pages.

Oracle Corporation, "Oracle Text 9.2.0 Technical Overview," Jun. 3, 2002, http://oracle.com/products/text/x/ot920.html, printed Sep. 12, 2003, pp. 1-21.

Oracle Corporation, "Oracle Ultra Search Online Documentation, Release 9.0.2 Production, Clustering and the Query Syntax Expansion," Nov. 20, 2002, http://oracle.com/products/ultrasearch/htdocs/qsyntax.htm, printed Sep. 12, 2003, pp. 1-7.

Oracle Corporation, "Oracle9i Database, Daily Feature, Query Template," Jun. 13, 2002, 3 pages.

PCT International Search Report from PCT application No. PCT/US2004/10020, dated Nov. 30, 2004, 4 pages.

Written Opinion of the International Preliminary Examining Authority received in International application No. PCT/US2004/010020, Nov. 26, 2004, 6 pages.

* cited by examiner

SYSTEM AND METHOD FOR APPLYING RANKING SVM IN QUERY RELAXATION

CROSS REFERENCE TO RELATED APPLICATIONS

This application is related to U.S. patent application Ser. No. 10/434,845, filed Mar. 8, 2003, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to generating query results, as well as to information management systems that can be used with a heterogeneous enterprise environment, which can include structured data in a relational database as well as unstructured data stored in document images and document management applications. Embodiments also relate to applying ranking query results such as support vector machine (SVM) methods and query relaxation methods to search secure data repositories that contain documents or other data items belonging to numerous heterogeneous enterprise environments. Still further embodiments relate to adjusting rank functions using machine learning methods to automatically train ranking functions to obtain improved results in a query, such as in an enterprise search system able to crawl and search heterogeneous enterprise content.

Typically in an enterprise relational database, query generators are used to construct database queries which are then sent to a database for execution. A user constructs a query by selecting items from a drop down list of items displayed on the screen. The items may represent data or documents which are to be obtained from a database or a URL, or alternatively the items may represent operations that are to be performed on these data, Once the items have been selected, the query generator then generates a query, usually in Structured Query Language (SQL), for execution by the database. Often, the query consists of keyword searches for documents or simply from the drop down list for structured data. However, when an enterprise corpora consists of heterogeneous applications or where the same document has differing attributes emphasized in heterogeneous applications, keyword searches and drop down list searches of structured data will not meet the needs of a sophisticated enterprise search end user.

An end user in an enterprise environment will also frequently search huge databases, sometimes external to the heterogeneous enterprise corpora environment. For example, Internet search engines are frequently used to search the entire World Wide Web. Information retrieval systems are traditionally judged by their precision and recall. Large databases of documents, especially the World Wide Web, contain many "low quality" documents where the relevance to the desired search term is extremely low or non-existent. As a result, searches typically return hundreds of irrelevant or unwanted documents that camouflage the few relevant documents that meet the personalized needs of an end user. In order to improve the selectivity of the results, common techniques allow an end user to modify the search, or to provide additional search terms. These techniques are most effective in cases where the database is homogeneous and already classified into subsets, or in cases where the user is searching for well known and specific information. In other cases, however, these techniques are often not effective.

A typical enterprise has a large number of sources of data and a large number of different types of data. In addition, some data may be connected to proprietary data networks, while other data sources may be connected to and accessible from public data networks, such as the Internet. More particularly, information within a single enterprise can be spread across Web pages, databases, mail servers or other collaboration software, document repositories, file servers, and desktops. In enterprise search, different system deployments or different corpora may require different ranking algorithms to return a customized listing of hits to an end user. Providing a simple and intuitive way to allow customers ranking search results in heterogeneous enterprise environments is critical to improve user flexibility and personalization.

One approach to search heterogeneous enterprise corpora utilizes a secure enterprise search (SES) system, such as may be found in the Oracle® Secure Enterprise Search product from Oracle Corporation of Redwood Shores, Calif., a standalone product or integrated component that provides a simple yet powerful way to search data across an enterprise. An SES system can crawl and index any content and return relevant results in a way that is familiar to users, such as is returned for typical Internet-based search results. SES also can provide a query service API, for example, that can easily be plugged into various components in order to obtain a search service for those components.

A SES enterprise search system can utilize the text index of a database. In one embodiment, a database application accepts documents and generates the lists and other elements useful for text searching. An application programming interface (API) allows a user to submit queries, such as text queries, to search documents based on, for example, keywords.

A query layer can be configured to receive queries from users, applications, entities, etc. These can be any appropriate queries, such as simple text queries entered through a search box or advanced queries. The query layer can convert a user query into the appropriate text queries, making sure security, authorization, authentication, and other aspects are addressed, such that the results are returned to the user based on what the user is allowed to access across the enterprise.

In other applications, search engines typically provide a source of indexed documents (from the Internet or an intranet) that can be rapidly scanned in response to a search query submitted by a user. As the number of documents accessible via an enterprise intranet or the Internet grows, the number of documents that match a particular query becomes unmanageable. Previous approaches for prioritizing searches have involved keyword priorities and pairs of keywords leading to some limited search results improvement. However, not every document matching the query is likely to be equally important from the user's perspective. As a result, a user may still be overwhelmed by an enormous number of documents returned by a search engine, unless the documents are ordered based on their relevance to the user's specific query and not merely limited to keywords or pairing of keywords.

Another problem is that differing deployments in a heterogeneous enterprise environment may want to emphasize different document attributes, creating a difficult task for a user attempting to return results from such a document. Often, the results of such a search will be that the desired document hit is at the end of several pages of results.

One way to order documents is to create a page rank algorithm. Many search engines also provide a relevance ranking, which is a relative numerical estimate of the statistical likelihood that the material at a given URL will be of interest in comparison to other documents. Relevance rankings are often based on the number of times a keyword or search phrase appears in a document, its placement in the document and the size of the document. However, in the context of differing attributes for the same document in a heterogeneous enterprise environment, such relevance ranking tools do not offer an end user the desired level of configurability and customization currently desired.

Ranking functions that rank documents according to their relevance to a given search query are known, and while useful in some settings, these functions do not allow a consistent user in a heterogeneous enterprise environment to personalize ranking results based on an end user set of preferences, either globally or for a single instance. Therefore, efforts continue in the art to develop ranking functions that provide better search results for a given search query compared to search results generated by search engines using known ranking functions. The ability to allow an enterprise end user to change ranking functions to customize the ranking of query results returned in heterogeneous enterprise environment to return personalized rankings of content for a single instance within the enterprise has remained unsolved.

Another way to improve query results is to utilize an applied ranking support vector machine (SVM) to change ranking functions. In applications related to Internet Web search, for example, ranking functions need to be changed frequently to handle search requirements. In enterprise search, different deployments of search systems or different type of search corpora may require different ranking functions. A query relaxation process can improve query efficiency and generate a hit list with higher relevancy if a feature vector formation for an early ranking function is cheaper and an early feature vector and ranking function in combination actually generates more relevant hits. Where both of these conditions are met, providing a query relaxation technique coupled with a machine learning ranking SVM method yields improved query results to an end user in a heterogeneous enterprise environment.

Therefore, a simple, intuitive, and heuristic method to allow an end user to apply ranking SVM in query relaxation to meet global or single instance search requirements in a heterogeneous enterprise environment query is needed.

BRIEF SUMMARY OF THE INVENTION

Systems and methods in accordance with various embodiments of the present invention provide for query relaxative ranking for support vector machines in order to provide more accurate and useful search results for a user, client, or application. Such an approach can comprise an enterprise-wide system query execution based on a customer setting globally or in a single instance of a heterogeneous enterprise environment.

In one embodiment, a set of ranked query item pairs is obtained, each query item pair corresponding to a query and a hit document. Each query item further corresponds to a set of feature vectors including a set of features and corresponding feature weights. These feature weights can be set and/or adjusted by a user, client, or application, for example. A series of query relaxation operations or steps can be executed, typically in sequence, wherein each query relaxation operation extracts one of the set of feature vectors for an item pair and calculates a relevancy score using the extracted feature vector and a learned ranking function that is unique for that query relaxation operation or step. A hit list for a user query then is generated that contains hits from the executed query relaxation operations. In one embodiment, the hit list includes any hits obtained from the sequence of query relaxation operations. In another embodiment, the hit list only contains the most relevant hits from the operations.

The hit list is displayed to the user. The user can have the option of providing feedback on the hit list, such as the actual perceived relevancy of items of the list to the user in regard to the submitted user query. This feedback then can be used to adjust the appropriate weighting functions and update the corresponding learned ranking function. The user can continue to provide feedback in order to further update the learned ranking function until a desired hit is displayed that is consistent with user search result preferences.

The ranked query item pairs can be obtained from across a heterogeneous enterprise network. The set of features can include an occurrence of a query term in metadata for a hit document, occurrence of a query term in a document body, and a document static rank. A query term can include, for example, a title, keyword, description, or reference text. A static rank can include, for example, a page rank or a human generated document static rank. Execution of the series of query relaxation operations can be terminated when a result page is filled by the hit list or when every operation or step has been executed.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
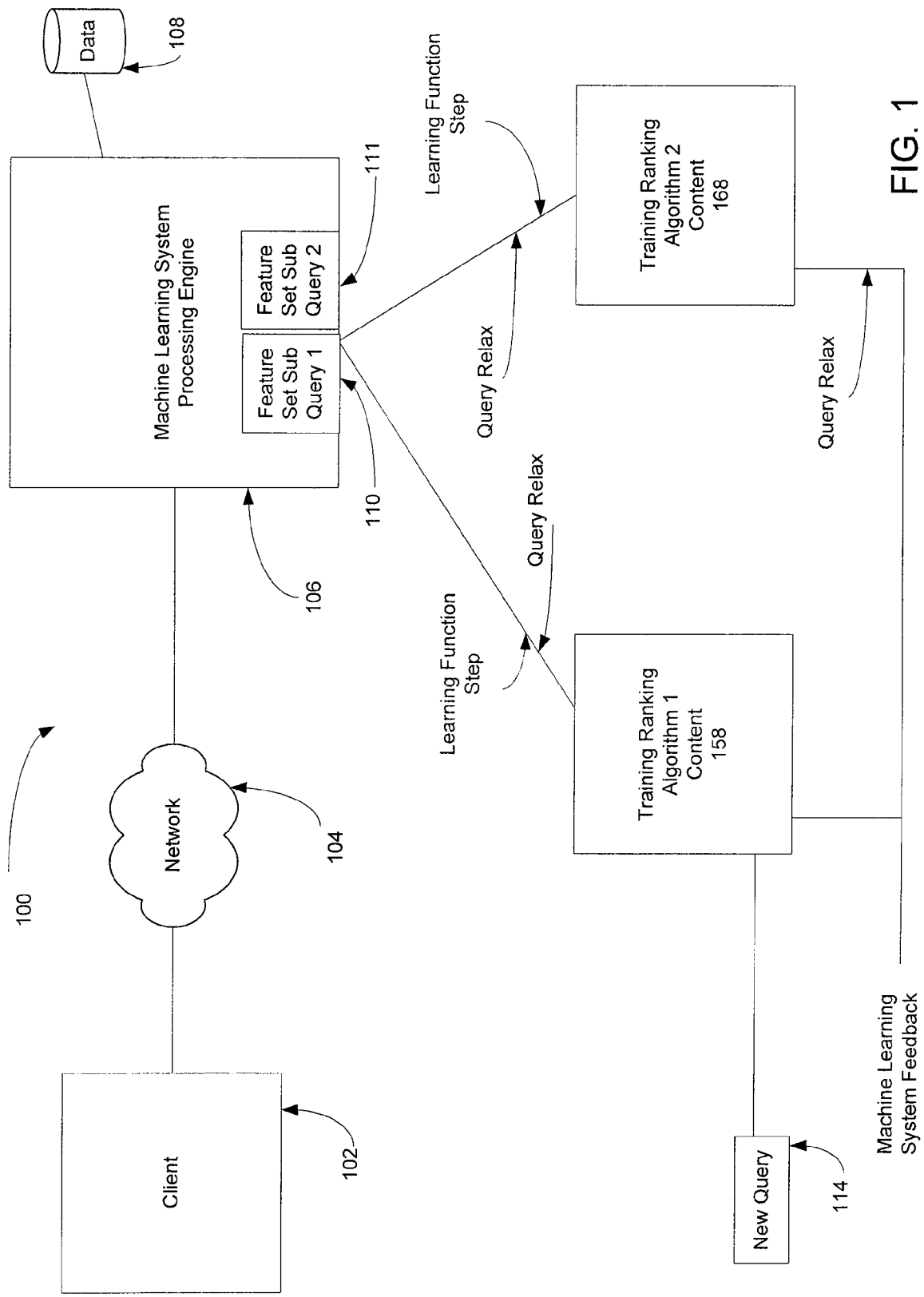
FIG. 1 illustrates an overall process of applying ranking SVM in Query Relaxation.
Figure 2:
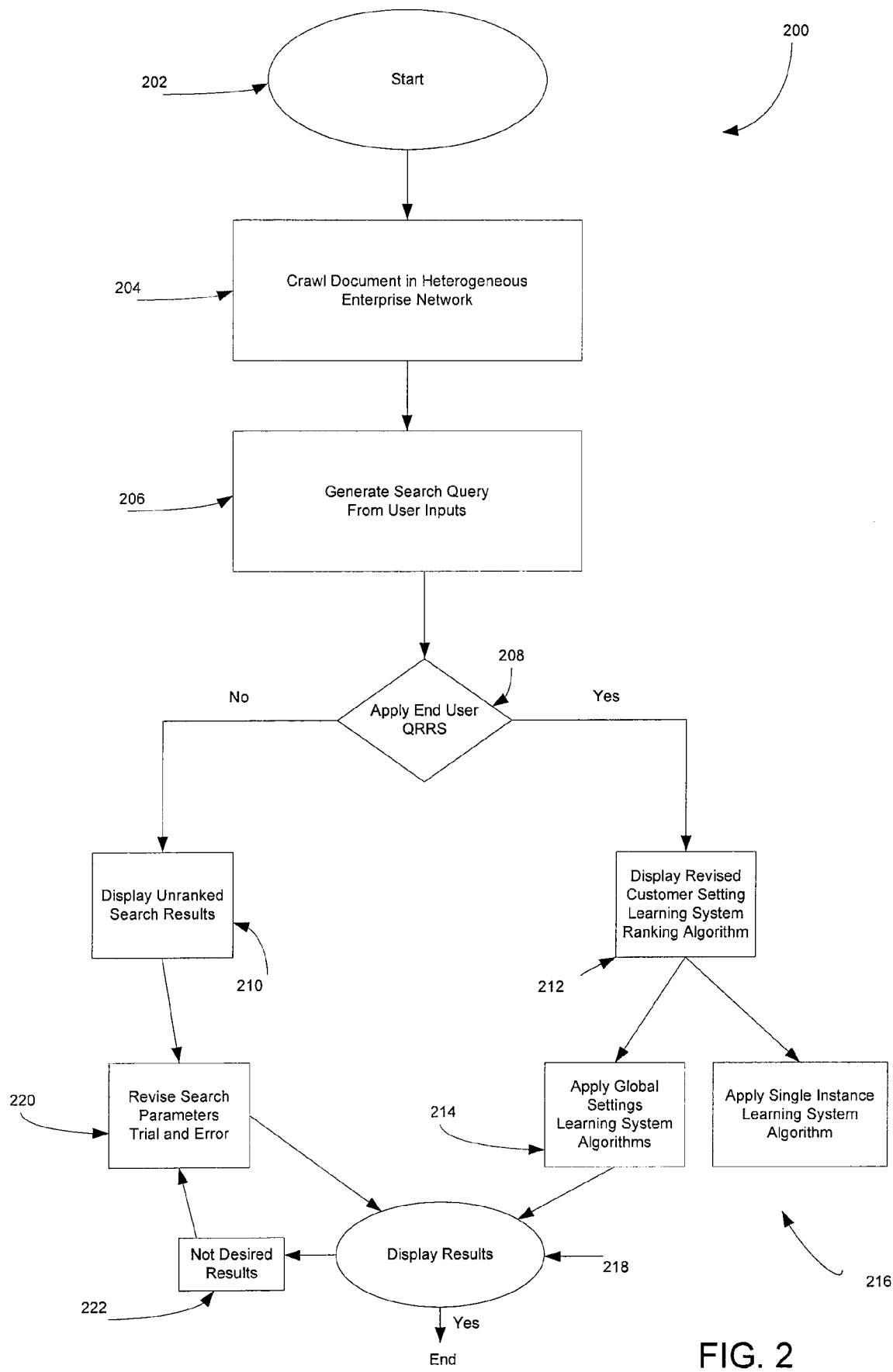
FIG. 2 illustrates a method of processing a client query utilizing a set of query relaxative ranking SVM factor training steps in a heterogeneous enterprise environment system.

Systems and methods in accordance with various embodiments of the present invention overcome the aforementioned and other deficiencies in existing query and search system by providing for query relaxative ranking, such as for support vector machines. Such an approach can comprise an enterprise-wide system query execution based on a customer setting globally or in a single instance of a heterogeneous enterprise environment. As discussed above, ranking functions in an enterprise search engine often need to be adjusted in order to handle various needs for different types of information, and in Internet web searching, ranking functions need to be changed frequently in order to handle search spam and other issues. In enterprise search, different deployments of search systems or different types of search corpora may require different ranking functions. One way to adjust ranking functions is using machine learning methods to automatically train ranking functions so that existing ranking functions become more accurate over time and can still address various needs and security issues.

In one embodiment, a Query Relaxative Ranking SVM (QRRS) system is provided for query execution based on a customer setting. Here, a system is utilized to display query results to a user on a graphical client interface wherein a database repository is coupled to a server computer and configured in network communication with a client computer. The displayed query results are obtained by creating a list of document-query pairs that are modeled as a combination function which utilizes ranking and learning functions.

The importance of various ranking factors may be defined by collecting user feedback to create a learning heuristic to decrease time between training and ranking learning. The ranking factors can specify document attributes, such as document title, document body, document page rank, etc., as in previous pure ranking algorithm and modified ranking algorithm approaches.

Ranking SVM treats the ranking function learning problem as a binary classification training problem. The input to the learning process is ranked item pairs. In a ranked pair, if the first item is ranked higher than the second item, this pair belongs to a first class. If the first item is ranked lower that the second item, this pair belongs to a second class. The output then is a classification function that minimizes classification errors with a large margin. The classification function can be treated as a ranking function, which evaluates the relevancy of a single item.

In a search engine QRRS system in accordance with one embodiment, a ranked item can be modeled as a pair consisting of a query and a hit document. Only items that have the same query are ranked relative to one another. Each item in this approach is represented by a feature vector, which lists features and corresponding feature weights. A feature can be any evidence that is used to determine the relevance of a document related to a given query. A feature can be an occurrence of query terms in document metadata such as title, keyword, description, reference text, etc. Also, a feature can be an occurrence of query terms in the document body or in the document static ranks, such as page rank, human generated document static ranks, etc. A ranking function accepts an item feature vector and produces relevancy scores for the item. The higher the score, the higher this item will be ranked.

In one embodiment the evaluation of a ranking function consists of two steps. The first step involves extracting a feature vector of the item. The second step involves computing a relevancy score based on the corresponding input feature vector. The second step can finish after one or several operations in memory, and feature vector formation can be accomplished by searching an inverted index. If the inverted index is too large to be stored in memory, costly disk access is necessary. However, query relaxation can solve this problem. Instead of forming a whole feature vector and using a single ranking function, query relaxation methods can be used to form several feature vectors, each of which corresponds to a ranking function.

Each relaxation step has one type of feature vector and a ranking function. In each step of query relaxation, the feature vector is extracted and formed before the ranking function is evaluated. To produce the first of page of a search result, which normally contains 10 hits in one embodiment, query relaxation steps are executed one by one until the relaxation steps finish or the first result page is filled up. The union of hit lists from all relaxation steps should consist of all documents hit by the query for completeness. The query relaxation can improve query efficiency and generate hit lists with high relevancy, if the following two features are satisfied. First, the feature vector formation for the early ranking function is cheaper, and second, the early feature vector and ranking function in combination does generate higher relevant hits. These conditions can be satisfied simultaneously if some metadata is chosen as the feature for the early steps. The inverted index for those specific chosen metadata, such as title, reference text, etc., can be of small size and therefore can be cached in memory for fast access. Documents that match query terms in those metadata are more relevant than in other metadata or body.

According to yet another aspect of the present invention, a training item pair in ranking SVM can be represented by two feature vectors, e.g., $x_i$ and $x_j$. To introduce non-linear kernels in Ranking SVM, a generic mapping $F(x)$ is applied to the feature vectors. When $F(x)=x$, the problem is reduced to a linear kernel case. The training process is the process to learn a ranking function in the form of $wF(x)$, where w is the weight factor to be learned and is multiplied by each instance of $F(x)$, as in $w*F(x)$. In the linear kernel case, w can be computed explicitly but in a non-linear kernel case, w normally is written into a linear combination of training vectors $F(x)$ in order for the kernel trick to be applied. The classification problem is formed by the Ranking SVM as an optimization problem with some constraints.

By applying weighted factors to learn a ranking function, a machine learning application is formed where the combination of training vectors $F(x)$ allow data to be optimized with constraints. As a result, query document pairs are assigned a classification score where a higher score for a document means a higher ranked document. The user may specify how good of a fit exists between a given query and document. User feedback is collected by clicking on any document and noting how good of a fit exists measured by a relevancy score. The resulting ranking SVM application requires less user time than scoring each individual document because only the most relevant documents are selected from each returned results list.

In one embodiment, the conventional binary SVM classification problem differs from the Ranking SVM system in that the single vector is replaced with a pair of vectors: $F(x_i)-F(x_j)$. The solution weight vector can be written in the form of training pairs. The ranking function w*F(x) can also be written in the form of kernel $k(x, x_j)=F(x) F(x_j)$.

According to another aspect, different groups of features are formed to apply Ranking SVM to query relaxation steps, wherein each group of features corresponds to one relaxation step. Ranking function in each step is then trained separately according to different feature vectors formed by different feature groups.

In one embodiment, a user issues a query on metadata only, rather than on document contents. If enough hits are returned from the metadata, the user may stop, resulting in much faster query results returned. One benefit to this methodology is a dramatically improved response time. A user will input the feedback machine learning training of each ranking algorithm into each step. Further, a different ranking SVM algorithm will be assigned for each relaxation step by splitting an early function vector from the feature input vector in each step.

According to another aspect, new document query pairs may be weighted more heavily than old document query pairs. As a result, a user may develop a method to tune learning algorithms more quickly by using feedback gathered in machine learning feature vector steps. The resulting learning heuristic allows a user to more efficiently collect feedback, decreasing time between training and ranking learning by adjusting ranking algorithms in a different way.

FIG. 1 illustrates an exemplary enterprise-wide system 100 for providing ranking SVM query relaxative algorithms based on a customer setting globally or in a single instance of a heterogeneous enterprise environment. A client 102 submitting a query, for example, can connect to a machine learning system processing engine 106 through a communications network 104, the engine capable of query execution based on a customer setting globally or in a single instance of a heterogeneous enterprise environment, whereby query results can be displayed on an interface of the client 102. The approach may be described in the context of computer-readable instructions, such as program modules, being executed by a computer. Program modules can include routines, programs, objects, components, and data structures that perform particular tasks or implement particular abstract data types. Such approaches also may be practiced in distributed computing environments where tasks are performed by remote processing devices that are linked through a communications network. In a distributed computing environment, program modules may be located in both local and remote computer storage media including memory storage devices.

The machine learning system processing engine 106 includes a series of feature set sub-queries 110, 111 and is in communication with a database repository 108. The feature set sub-query 1 and 2 correspond to learning function steps and query relaxation steps. Overall, the learning function steps, feature set sub queries, and training ranking algorithms 158, 168 comprise a machine learning system and related user feedback system, described in greater detail below, to allow a user to execute a new query 114, which is shown to come separately but could come directly from the interface of the client 102. One important feature is the ability to separate a query relaxation component from a training ranking algorithm in order to improve efficiency by designing an early function step comprising metadata in each corresponding user defined attribute.

In one embodiment, an extensible enterprise search mechanism provides for a method 200 useful for crawling and searching of a variety of sources across an enterprise, regardless of whether any of these sources conform to a conventional user role model. In a heterogeneous enterprise wide environment, sources may represent the same document in differing ways to highlight a plurality of attributes leading to difficulties to rank results. Method 200 begins at start 202. The system can first perform a document crawl 204. A user then may generate a search query 206 to be executed, the query being generated from user inputs. If end user QRRS is not to be applied to the query 208, then the unranked search results can be displayed 210. If necessary, the search parameters can be revised in a trial and error approach 220, whereby the new results can be displayed 218, and if the results are not what the user desired 222, the parameters can be revised again 220.

If the end user QRRS is to be applied to the query 208, then the revised customer setting learning system ranking algorithm can be displayed that can transform the user query to provide for dynamic querying 212, whereby global setting learning system algorithms can be applied 214, as well as single instance learning system algorithms 216, as appropriate. These ranking SVM query relaxative algorithms provide for a more current and personalized result list to be displayed to the user 218 than can be obtained for static queries.

When default ranking algorithms are utilized, such as those found in a standard web browser, unranked search results are presented to an end user. Unranked search results are further complicated when the same document may yield different results when the same document is searched in different applications, a common problem in a heterogeneous enterprise environment. As a result, the end user is forced to adjust keywords multiple times or search through long lists of unranked results to find the desired query search results. The resulting trial and error search methodology 222 is inefficient, costly, and slow. However, when the end user utilizes a ranking SVM query relaxative algorithms including a series of sub-query combination step functions, a result based on end user preferences is obtained from a heterogeneous enterprise environment. Further, such results can be tuned and optimized by continually updating the learning system combination function to more accurately reflect user preferences. Also, ranking SVM query relaxative algorithms results can be tuned and optimized for each single instance of query results displayed or via an administrator or user's global settings preferences.

In one aspect, a client interface comprises a set of one or more pairs of document and queries is communicatively coupled to a data repository via a machine learning system processing engine. The machine learning system processing engine comprises a series of one or more learning function steps representing sub-queries corresponding to each step necessary to create training algorithms for each step. A machine learning system processing engine may be tuned according to a set of end user preferences by splitting a set of document query pairs into sub-queries for carefully defined feature sets. A new query may be defined based on the machine learning processing system feedback based on a correlation of a series of different algorithms for each step. Each step function comprises both a query relaxative component and a feature set sub-query content ranking algorithm. In each step, a query relaxation process is performed on the sub-query related metadata prior to performing a sub-query ranking algorithm on the document query pair data. In one method of retrieving search results from a corpus, training data gathered from user defined feedback is utilized to revise document candidate pair lists. Each document candidate pair comprises a first and second data element term. Each data element has a label that classifies that data element, at least a portion of such label which is metadata. A machine learning ranking model is developed to rank data elements, candidate pair lists and revised candidate pair lists based on a computed relevancy score.

Figure 3:
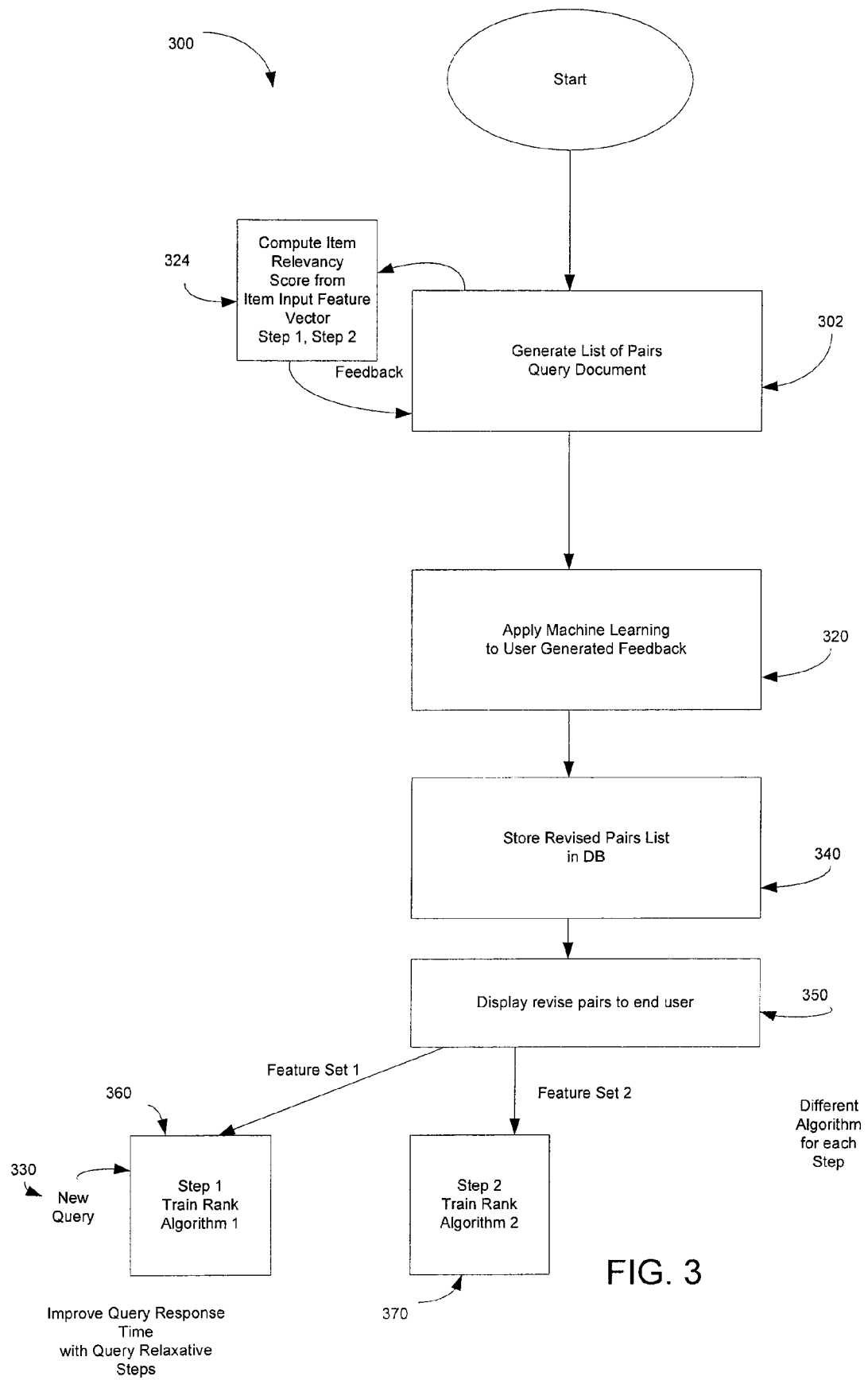
FIG. 3 illustrates a method to implement query relaxative ranking SVM (QRRS) factor training steps in a heterogeneous enterprise environment system.

FIG. 3 illustrates a process 300 in accordance with one embodiment wherein a list of document-query pairs is modeled as a binary classification training problem combination function of a ranking machine learning function. Here, a list of pairs of query and document are generated 302, the item relevancy score being computed using the item input feature vector 324. The QRRS application is used for ordinal regression. The importance of various ranking factors may be defined by collecting user feedback in this way to create a learning heuristic to decrease time between training and ranking learning based on an item relevancy score created from a series of feature vectors sub-query steps. The ranking factors may be represented by feature sets, etc., and can specify document attributes, such as document title, document body, document page rank, etc. as in previous pure ranking algorithm and modified ranking algorithm approaches. After the pairs are generated, machine learning can be applied to the user generated feedback 320 and the revised pairs list can be stored in the appropriate data store 340. The revised pairs can be displayed to the end user 350, wherein different feature sets can be used to train the ranking algorithm 360, 370. A different algorithm can be used for each step.

Figure 4:
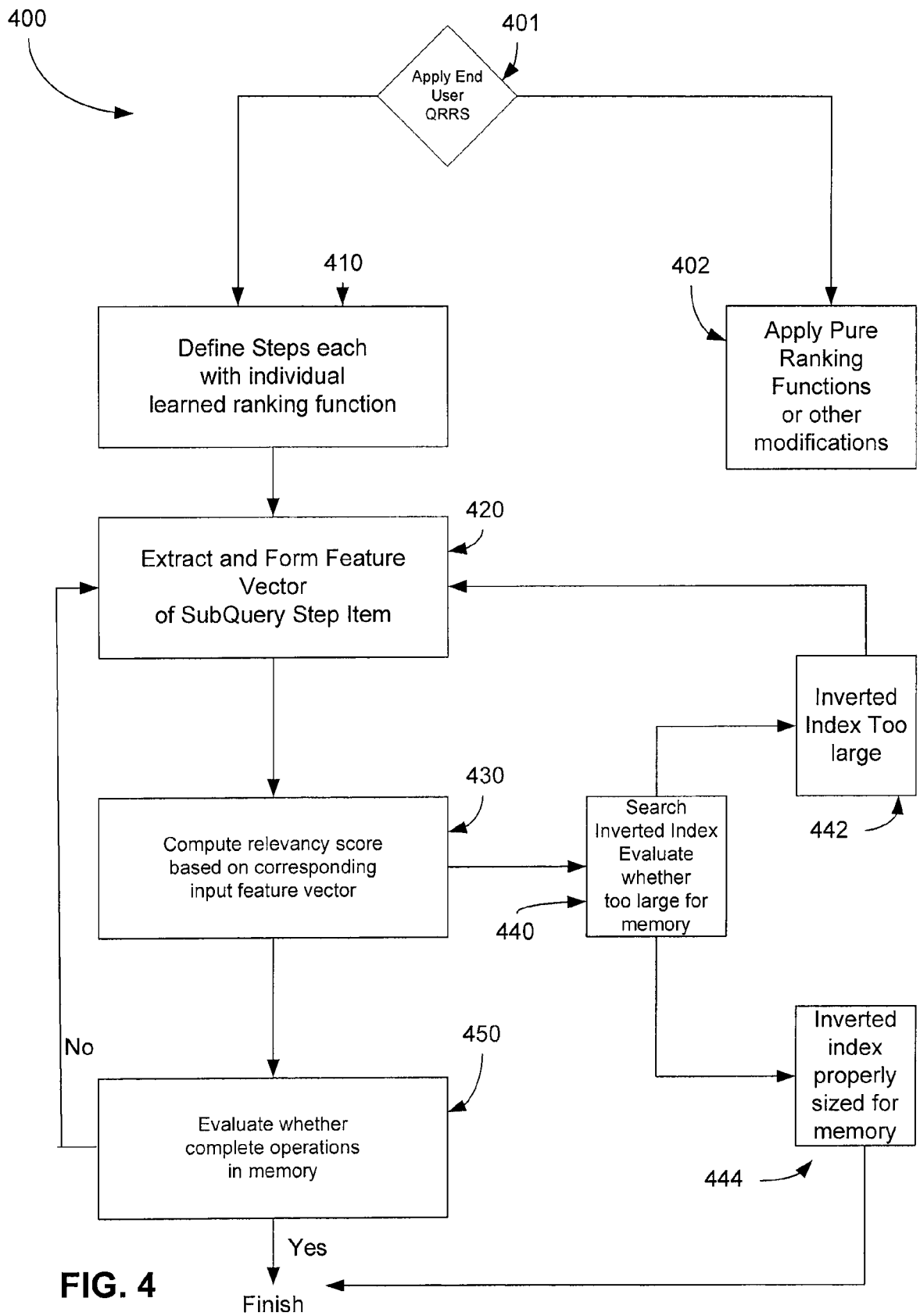
FIG. 4 illustrates a further aspect of the invention wherein a method to apply a QRRS system by defining learning ranking function steps and a corresponding relevancy score to extract and form feature vectors for each sub-query step.

As discussed above, in a binary classification training problem the input to the learning process includes ranked item pairs. In a ranked pair, if the first item is ranked higher than the other, this pair belongs to one class. If the first item is ranked lower, this pair belongs to a second class. The output is a classification function that minimizes classification errors with a large margin to produce a revised document query pairs tuned list. The classification function can be treated as a ranking function, which evaluates the relevancy of a single item. In a search engine ranking system, a ranked item is a pair consisting of a query and a hit document. Only items that have the same query are ranked. Each item is represented by a feature vector, which lists features and corresponding feature weights. A feature can be any evidence that is used to determine the relevance of a document related to a given query. In general, a feature can be an occurrence of query terms in document metadata such as title, keyword, description, reference text. Also, a feature can be an occurrence of query terms in a document body or document static ranks. A ranking function accepts an item feature vector and produces a relevancy score for the item. The higher the score, the higher this item will be ranked. As illustrated in the process 400 of FIG. 4, end user QRRS can be applied to a query 401, such as by applying pure ranking functions or other modifications 402, or by defining steps with individual learned ranking functions 410. Feature vectors can be extracted and formed for each sub-query step item 420, and a relevancy score computed based on the corresponding input feature vector 430. An evaluation can be done as to whether the operations complete in memory 450. Also, an inverted index can be searched to evaluate whether the results are too large for memory 440, and if so 442, a new feature vector step can be performed 420. If properly sized for memory 444, the process can finish.

When a ranked item is modeled as a pair consisting of a query and a hit document, only items that have the same query are ranked in one embodiment. Each item is represented by a feature vector, which lists features and corresponding feature weights to allow an end user to "tune" a ranking function based on coupling a query relaxation method with a ranking SVM application discussed above. The end user can determine the best fit between the initial list of document query hits and a revised list produced from a trained learning system machine learning function. A feature itself can be any attribute of a document or evidence that is used to determine the relevance of a document related to a given query. More specifically, a feature can be an occurrence of query terms in document metadata such as title, keyword, description, reference text, etc. Also, a feature can be an occurrence of query terms in the document body or in the document static ranks, such as page rank, human generated document static ranks, etc. A ranking function accepts an item feature vector and produces relevancy scores for the item. The higher the score, the higher this item will be ranked. As a result of revised rankings, a revised pairs list will be stored in the data repository and displayed to an end user upon request.

Figure 5:
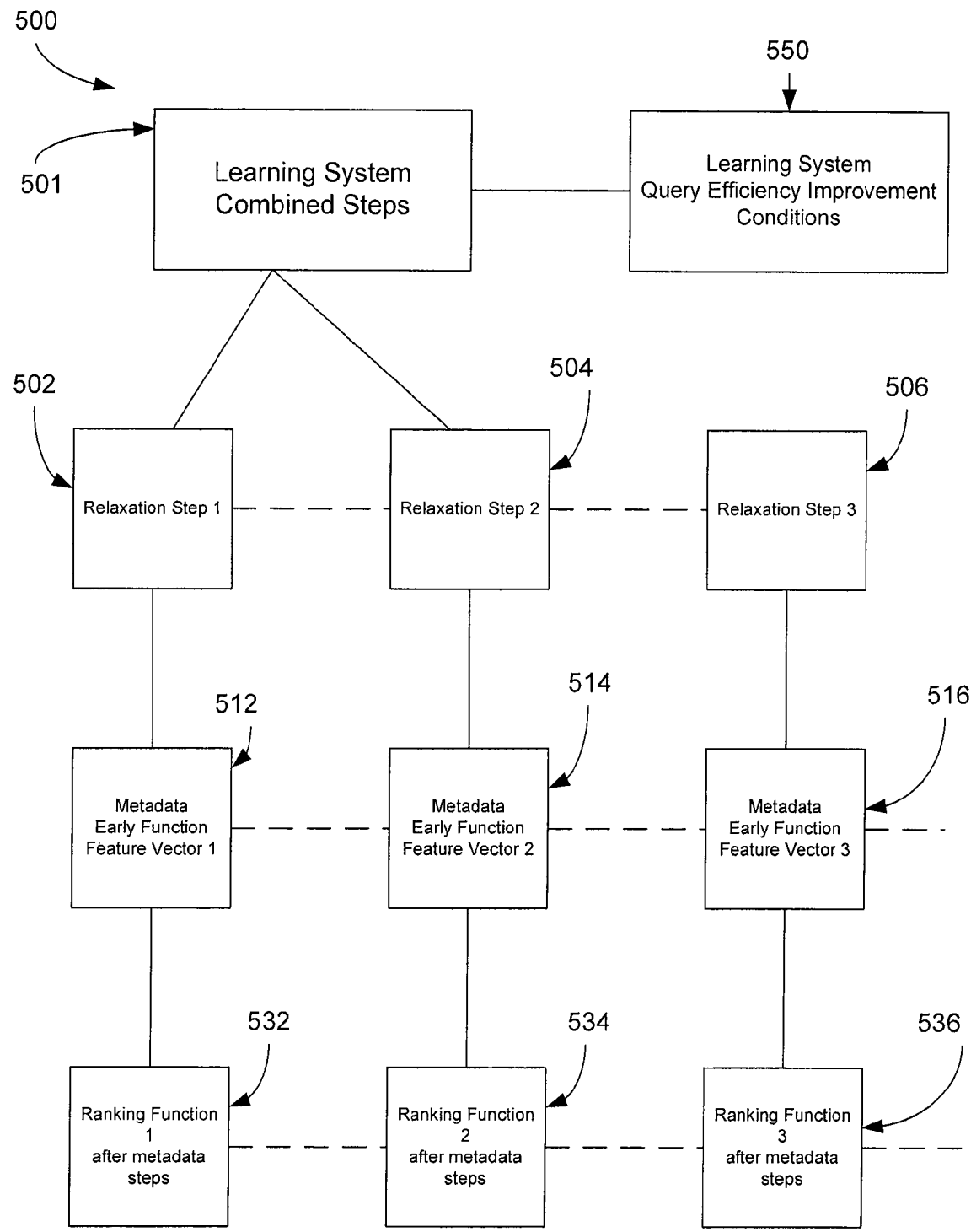
FIG. 5 illustrates a further aspect of the invention wherein a method of applying incremental steps to corresponding feature vector metadata and ranking functions is shown utilizing metadata as an early function relaxation step.
Figure 6:
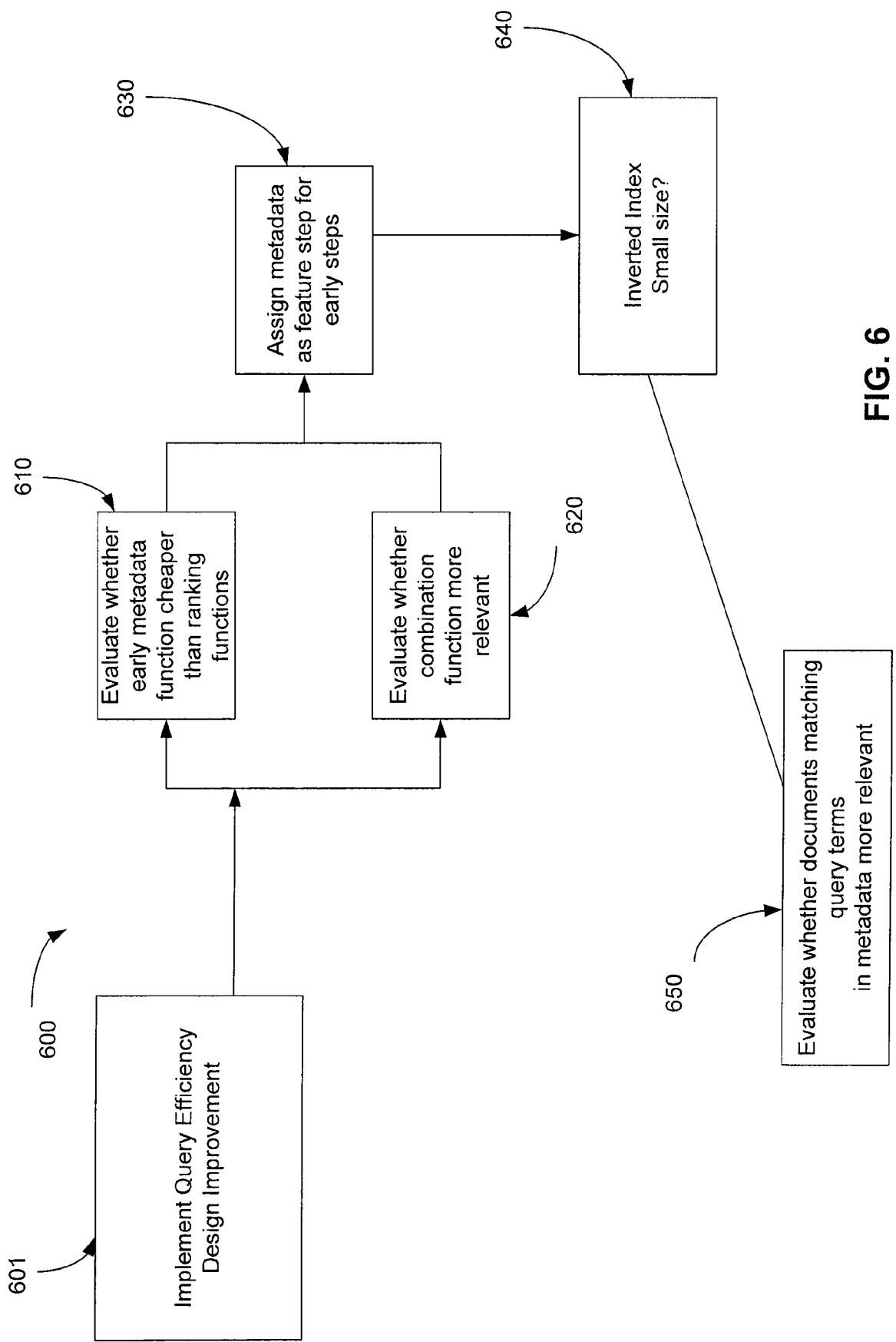
FIG. 6 illustrates a further aspect of the invention to implement a query efficiency design improvement method by comparing early function metadata and evaluating combinations of feature vectors and ranking functions to choose matching document query terms.

In accordance with one embodiment, to apply Ranking SVM to query relaxation steps, different groups of features are formed that each correspond to one relaxation step. The ranking function in each step is then trained separately according to different feature vectors formed by different feature groups. As shown in FIGS. 5-6, where metadata is chosen for the early feature vectors and performed prior to the content ranking functions, query efficiency is improved and response time is lowered.

In the process 500 of FIG. 5, the learning system query efficiency improvement conditions are determined 550 and the learning system combined steps are performed 501, wherein a set of relaxation steps can be performed 502, 504, 506, each utilizing a metadata early function feature vector step 512, 514, 516 and a ranking function step 532, 534, 536 after the metadata steps. As illustrated in the exemplary process 600 of FIG. 6, a query efficient design improvement is implemented 601 wherein an evaluation is made as to whether the early metadata function is cheaper than the ranking functions 610, as well as whether the combination function is more relevant 620. Depending upon the evaluation, the metadata can be assigned as a feature step for the early steps 630, and if the inverted index is of a small size 640, an evaluation is made as to whether documents matching query terms in the metadata are more relevant 650.

Figure 7:
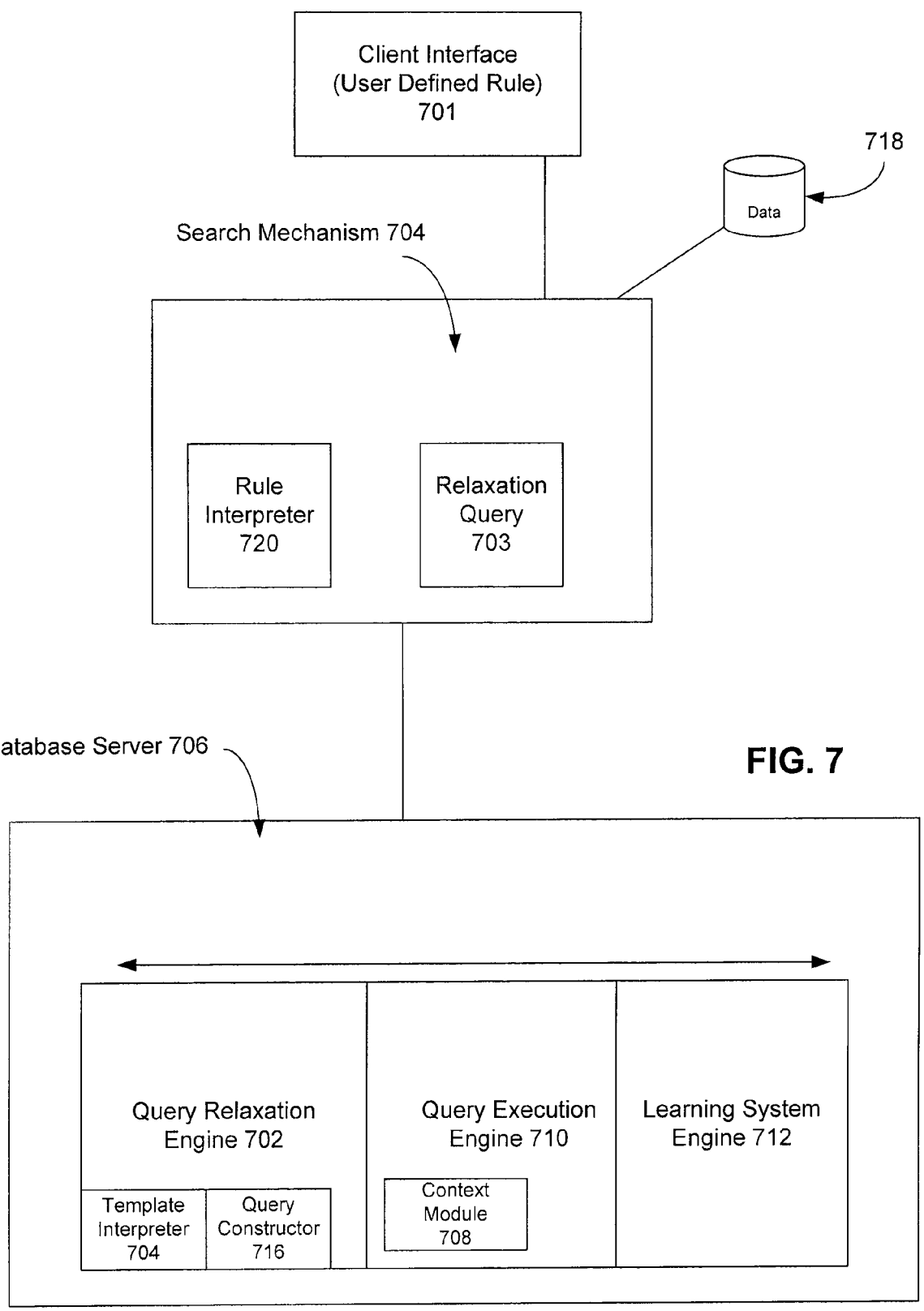
FIG. 7 illustrates exemplary computer components including a system relaxation query search mechanism, rule interpreter, and learning system engine.

FIG. 7 illustrates an exemplary system implementing a search engine Query Relaxative Ranking SVM approach based on a customer setting. A search mechanism 704 may include query relaxation component 703 and a rule interpreter 720 which operates to interpret and translate rules associated with an information search according to the updated and trained algorithm according to the learning system correlation and end user feedback mechanism. A user through a client interface 701 might provide rules such as search terms, AND, OR, etc., which specifies search criteria and an order to execute subsequent related sub-query steps upon completion of an initial query on related metadata. The search mechanism can obtain data from an appropriate database 718.

A feature set can be used to search content. However, the content will not be searched if enough hits to fill the first page occur on the basis of the metadata search. As a result, the cost and query response time is dramatically improved. Based on the attribute weights of the defined steps and query, a single instance combination machine learning algorithm function executed by an appropriate engine 712 communicatively coupled to a query relaxation and execution engines 702, 710 will produce the relevant value for each document in accordance with the end user preferences and personalization configurations (using template interpreter 704 and query constructor 706) to be delivered via a server computer 706 communicatively coupled to a heterogeneous enterprise environment. An end user of the search system may subscribe to a template in the query application interface by providing their own personalized feedback and preferences to the returned document query pairs for the single instance of the query communicated to the enterprise environment.

A database server, search mechanism and client interface thus comprise a search system including a query relaxation engine, a learning system engine and a query execution engine. The query relaxation engine further comprises a template interpreter and a query constructor wherein the query constructor executes a series of sub-query steps including a first step and one or more subsequent content steps. The first step will search only document query pairs including metadata. In an exemplary embodiment, a user of client specifies a search term, value or query pair values, referred to as search criteria, in the form of rules which are interpreted by a rule interpreter and translated into another format. For example, a user might provide a set of search rules such as (search terms query pairs, AND, OR), which specifies search criteria and an order in which to execute related sub-queries. Upon receiving a set of rules, rule interpreter constructs a query template based on the set of rules. According to one embodiment, the query template is in the form of a <text_query> template. According to one embodiment, the query template is in the form of a "rewrite template," described below. The query template represents search criteria and an order in which sub-queries associated with the search criteria are to be executed. In another embodiment, rule interpreter generates a relaxation query based on the rules received, for submission to the database server. The relaxation query includes search criteria and an order in which constituent sub-queries associated with the search criteria to be executed. Rule interpreter, or other modules within search mechanism, may be configured to provide other functionality to make users' interaction with the database server user-friendly.

According to another aspect, the inverted index will become effective only when the inverted index size is small enough fast access memory storage in cache. For example, the inverted index metadata is produced after a user selects an attribute field corresponding to the first step in a content training ranking factor. By searching the inverted index metadata for all user defined sub-queries corresponding to a particular sub query step document attribute, query response time is significantly improved because the search mechanism may not need to actually search the content training ranking SVM data.

According to another aspect of the present invention, the training ranking function output is a classification function that minimizes classification errors with a large margin. The classification function is treated as a training ranking function which evaluates the relevancy of a single sub query item.

Figure 8:
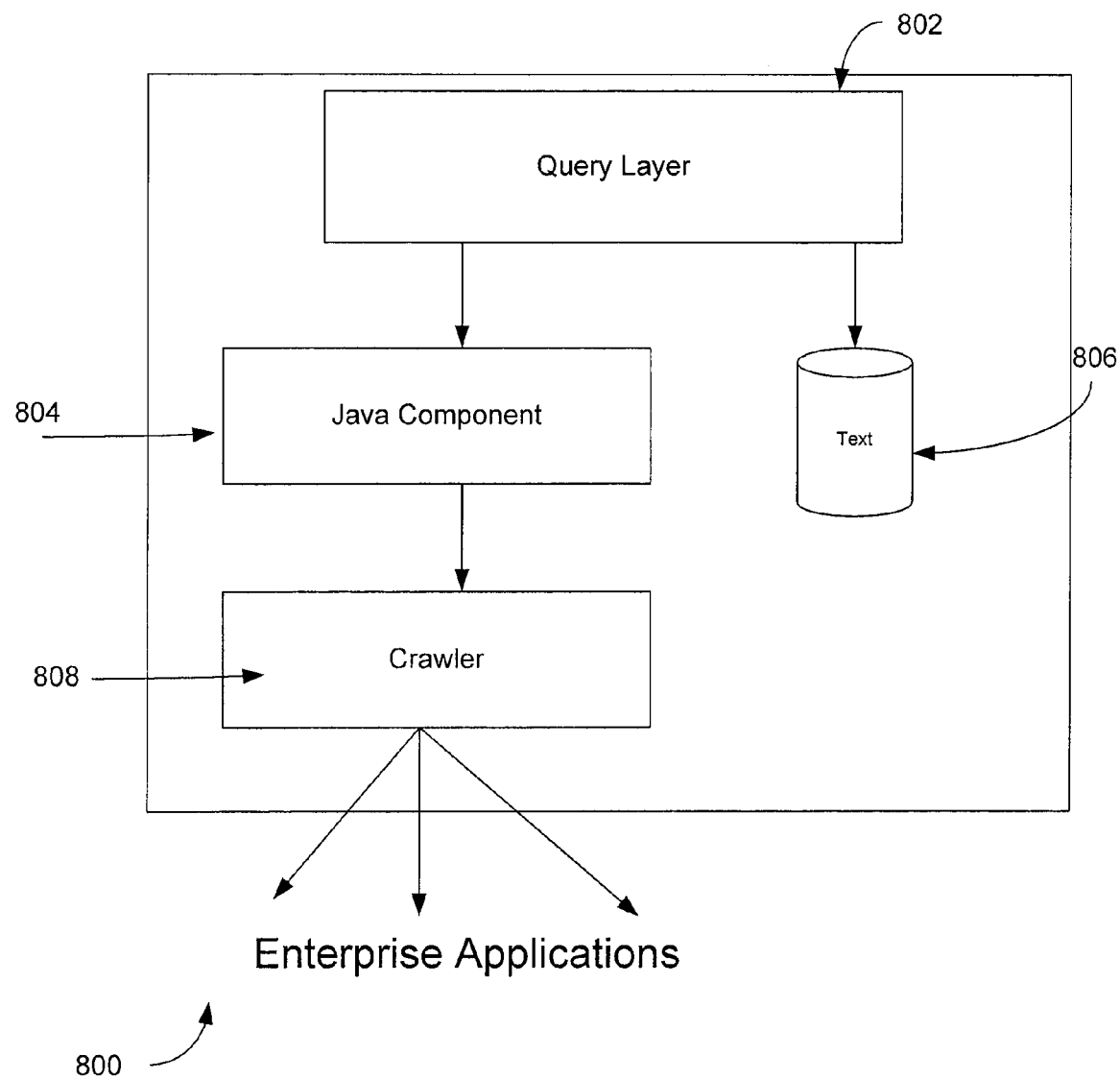
FIG. 8 further illustrates an exemplary implementation of an enterprise search system, client interface and a query layer to execute a QRRS system.

As discussed above, such functionality can be used advantageously with a secure enterprise search (SES) system. An exemplary SES system can utilize a query layer 802 and Java component 804 to drive a crawler component 808 to crawl enterprise applications, documents, and objects as illustrated in FIG. 8. A text index can then be stored in a database 806 with results of the crawl. In one embodiment, a database application accepts documents and generates the lists and other elements useful for text searching. An API allows a user to submit queries, such as text queries, to search documents based on, for example, keywords.

A query layer can be configured to receive queries from users, applications, entities, etc. These can be any appropriate queries, such as simple text queries entered through a search box or advanced queries. The query layer can convert a user query into the appropriate text queries, making sure security, authorization, authentication, and other aspects are addressed, such that the results are returned to the user based on what the user is allowed to access across the enterprise. This approach can be referred to as secure enterprise search, as an Internet search or other such searches typically are done only for public documents using more rigid queries. SES can also allow for searching of public documents, but when accessing secure content SES can ensure that only authorized persons are able to retrieve that content.

Exemplary Operating Environments, Components, and Technology

Figure 9:
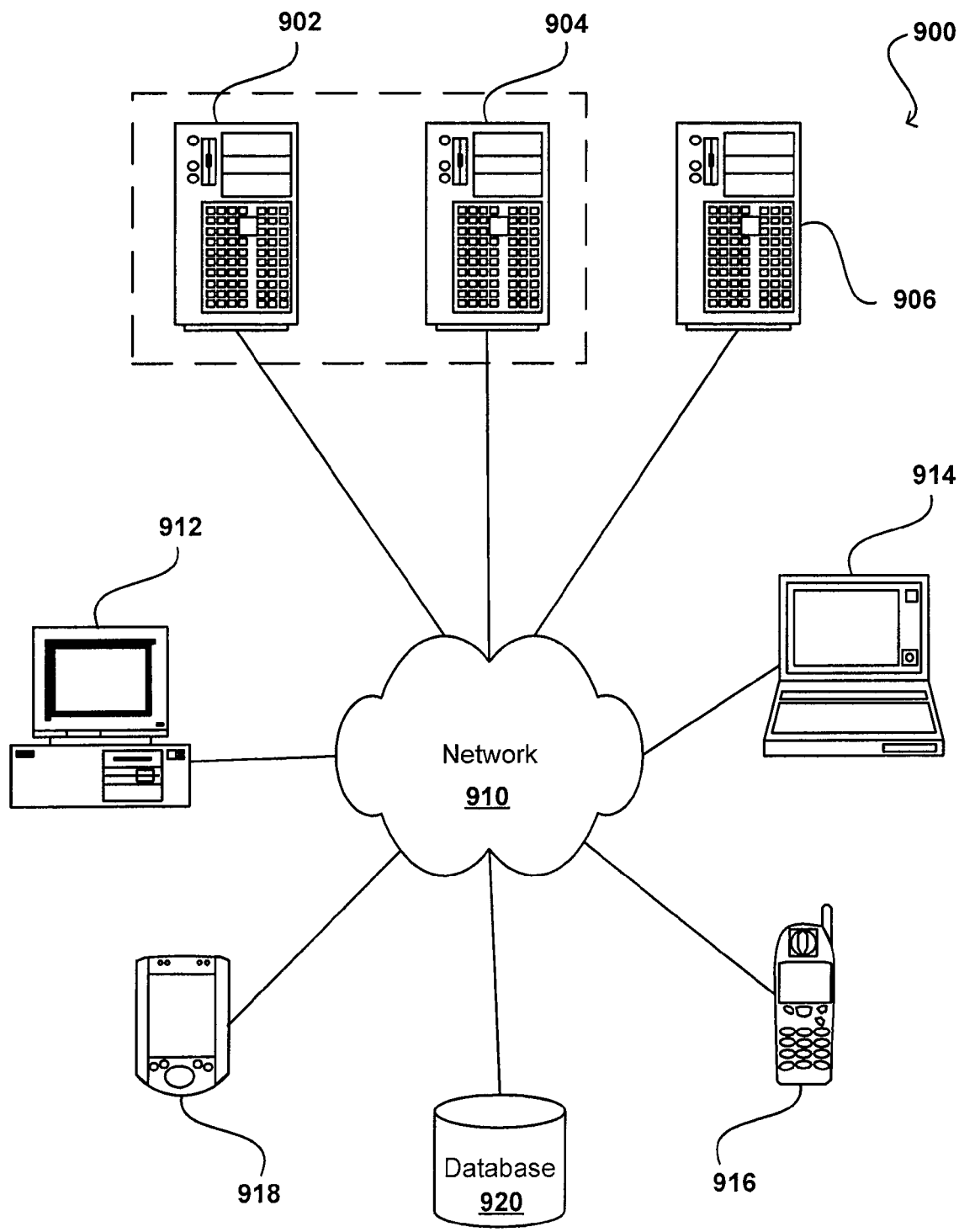
FIG. 9 illustrates components of a computer network that can be used in accordance with one embodiment of the present invention.

FIG. 9 is a block diagram illustrating components of an exemplary operating environment in which embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
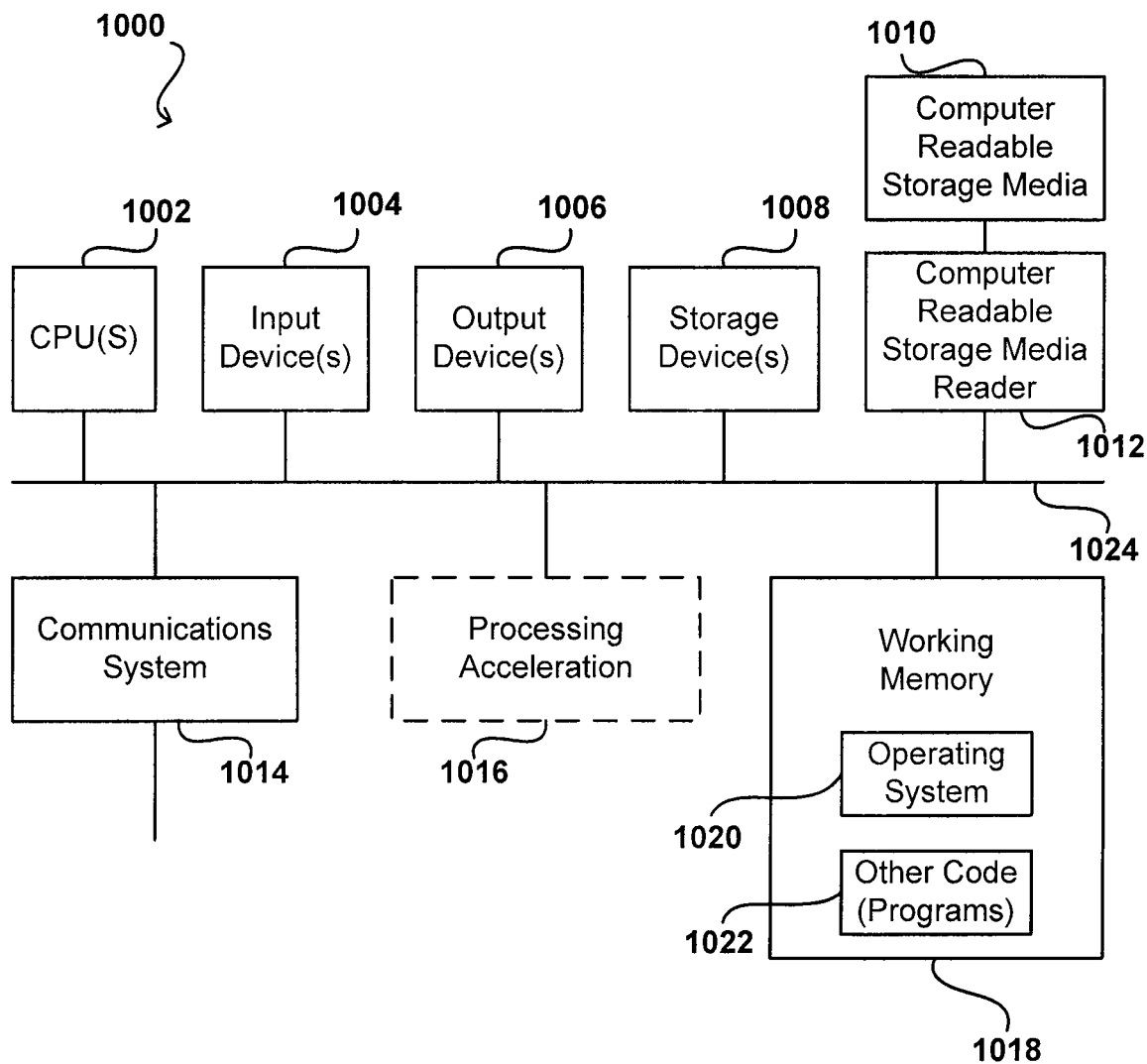
FIG. 10 illustrates components of a computerized device that can be used in accordance with one embodiment of the present invention.

FIG. 10 illustrates an exemplary computer system 1000, in which embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information.

The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method in a computer system for providing improved search results in response to a user query, the method comprising:
   obtaining a set of ranked query item pairs, each query item pair corresponding to a query and a hit document;
   for each hit document:
      executing a series of query relaxation operations, each query relaxation operation extracting one feature vector of a plurality of feature vectors for said each hit document; and
      calculating a relevance score using the one extracted feature vector and a learned ranking function that is unique for that query relaxation operation; and
   generating a hit list for the user query to be displayed to the user that contains hits from the executed query relaxation operations;
   modeling a ranked item as a pair comprised of a query and a hit document and only items that have the same query, wherein each item is represented by a feature vector of the plurality of feature vectors, which lists features and corresponding feature weights configured to provide a user to tune a ranking function based on coupling a query relaxation method with a ranking support vector machine (SVM) application, and wherein the user determines an optimal fit between an initial list of document query hits and a revised list produced from a trained learning system machine learning function and a feature includes any attribute of a document that is used to determine a relevance of a document related to a given query.

2. A method according to claim 1, wherein obtaining a set of ranked query item pairs includes obtaining query item pairs from across a heterogeneous enterprise network.

3. A method according to claim 1, further comprising:
displaying the hit list to the user; and
receiving feedback from the user regarding the hit list, the feedback being used to adjust a weight for at least one ranking factor of a learned ranking function in response thereto.

4. A method according to claim 3, further comprising:
allowing the user to continue to provide feedback in order to further update the learned ranking function until a desired hit is displayed that is consistent with user search result preferences.

5. A method according to claim 1, further comprising:
crawling a corpus of documents to produce an index of ranked item pairs.

6. A method according to claim 1, wherein:
at least one of the set of features includes an occurrence of a query term in metadata for a hit document, occurrence of a query term in a document body, and a document static rank.

7. A method according to claim 6, wherein:
the query term is at least one of a title, keyword, description, or reference text.

8. A method according to claim 6, wherein:
the static rank is at least one of a page rank and a human generated document static rank.

9. A method according to claim 1, further comprising:
terminating the execution of the series of query relaxation operations when a result page is filled by the hit list.

10. A method according to claim 1, wherein:
each feature weight is a linear combination of training vectors.

11. A method according to claim 1, further comprising:
classifying each query item pair into one of at least two classes based on a level of a relevancy score term.

12. A non-transitory computer-readable storage medium for providing improved search results in response to a user query having sets of instructions stored thereon which, when executed by a computer, cause the computer to:
obtain a set of ranked query item pairs, each query item pair corresponding to a query and a hit document;
perform for each hit document:
executing a series of query relaxation operations, each query relaxation operation extracting one feature vector of a plurality of feature vectors for said each hit document; and
calculating a relevance score using the one extracted feature vector and a learned ranking function that is unique for that query relaxation operation; and
generate a hit list for the user query to be displayed to the user that contains hits from the executed query relaxation operations;
model a ranked item as a pair comprised of a query and a hit document and only items that have the same query, wherein each item is represented by a feature vector of the plurality of feature vectors, which lists features and corresponding feature weights configured to provide a user to tune a ranking function based on coupling a query relaxation method with a ranking support vector machine (SVM) application, and wherein the user determines an optimal fit between an initial list of document query hits and a revised list produced from a trained learning system machine learning function and a feature includes any attribute of a document that is used to determine a relevance of a document related to a given query.

13. The non-transitory computer-readable storage medium according to claim 12, wherein the sets of instructions when further executed by the computer, cause the computer to obtain a set of ranked query item pairs includes obtaining query item pairs from across a heterogeneous enterprise network.

14. A non-transitory computer-readable storage medium according to claim 12, further comprising:
program code for displaying the hit list to the user; and
program code for receiving feedback from the user regarding the hit list, the feedback being used to adjust a weight for at least one ranking factor of a learned ranking function in response thereto.

15. A non-transitory computer-readable storage medium according to claim 14, further comprising:
program code for allowing the user to continue to provide feedback in order to further update the learned ranking function until a desired hit is displayed that is consistent with user search result preferences.

16. A non-transitory computer-readable storage medium according to claim 12, further comprising:
program code for crawling a corpus of documents to produce an index of ranked item pairs.

17. A non-transitory computer-readable storage medium according to claim 12, further comprising:
program code for terminating the execution of the series of query relaxation operations when a result page is filled by the hit list.

18. A system for providing improved search results in response to a user query, the system comprising:
a storage device; and
a computer processor in communication with the storage device, wherein the storage device has sets of instructions stored thereon which, when executed by the processor, cause the processor to:
obtain a set of ranked query item pairs, each query item pair corresponding to a query and a hit document;
for each hit document:
execute a series of query relaxation operations, each query relaxation operation extracting one feature vector of a plurality of feature vectors for said each hit document,; and
calculating a relevance score using the one extracted feature vector and a learned ranking function that is unique for that query relaxation operation; and
generate a hit list for the user query to be displayed to the user that contains hits from the executed query relaxation operations model a ranked item as a pair comprised of a query and a hit document and only items that have the same query, wherein each item is represented by a feature vector of the plurality of feature vectors, which lists features and corresponding feature weights configured to provide a user to tune a ranking function based on coupling a query relaxation method with a ranking support vector machine (SVM) application, and wherein the user determines an optimal fit between an initial list of document query hits and a revised list produced from a trained learning system machine learning function and a feature includes any attribute of a document that is used to determine a relevance of a document related to a given query.

19. A system according to claim 18, wherein the instructions, when executed by the processor, further cause the processor to:
   display the hit list to the user; and
   receive feedback from the user regarding the hit list, the feedback being used to adjust a weight for at least one ranking factor of a learned ranking function in response thereto.

20. A system according to claim 18, wherein the instructions, when executed by the processor, further cause the processor to:
   terminate the execution of the series of query relaxation operations when a result page is filled by the hit list.

* * * * *

UNITED STATES PATENT AND TRADEMARK OFFICE
CERTIFICATE OF CORRECTION

| | | |
|---|---|---|
| PATENT NO. | : 8,458,165 B2 | |
| APPLICATION NO. | : 11/770027 | |
| DATED | : June 4, 2013 | |
| INVENTOR(S) | : Liao et al. | |

It is certified that error appears in the above-identified patent and that said Letters Patent is hereby corrected as shown below:

On Title page, in column 2, item (56), under "Other Publications", line 5, delete "Clickthough" and insert -- Clickthrough --, therefor.

In the Claims:

In column 16, line 51, In Claim 18, delete "document,;" and insert -- document; --, therefor.

Signed and Sealed this
Eighth Day of October, 2013

Teresa Stanek Rea
*Deputy Director of the United States Patent and Trademark Office*